United States Patent
Nikitin et al.

(10) Patent No.: US 8,039,792 B2
(45) Date of Patent: Oct. 18, 2011

(54) WIDE BAND GAP SEMICONDUCTOR PHOTODETECTOR BASED GAMMA RAY DETECTORS FOR WELL LOGGING APPLICATIONS

(75) Inventors: Anton Nikitin, Houston, TX (US); Alexandr A. Vinokurov, Novosibirsk (RU); Rocco DiFoggio, Houston, TX (US); Mikhail V. Korjik, Minsk (BY)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/694,993

(22) Filed: Jan. 27, 2010

(65) Prior Publication Data

US 2010/0223010 A1    Sep. 2, 2010

Related U.S. Application Data

(63) Continuation-in-part of application No. 11/503,688, filed on Aug. 14, 2006, now Pat. No. 7,763,845.

(51) Int. Cl.
 *G01V 5/08* (2006.01)
(52) U.S. Cl. .................................... 250/269.1
(58) Field of Classification Search ............... 250/269.1
See application file for complete search history.

(56) References Cited

U.S. PATENT DOCUMENTS

| | | | |
|---|---|---|---|
| 3,508,439 A | 4/1970 | Alger | |
| 3,558,888 A | 1/1971 | Youmans | |
| 3,976,879 A * | 8/1976 | Turcotte | 250/266 |
| 4,468,863 A | 9/1984 | Van Steenwyk | |
| 4,834,493 A | 5/1989 | Cahill et al. | |
| 5,001,342 A | 3/1991 | Rambow | |
| 5,218,771 A | 6/1993 | Redford | |
| 5,659,133 A | 8/1997 | Sims et al. | |
| 5,773,829 A * | 6/1998 | Iwanczyk et al. | 250/367 |
| 6,347,282 B2 | 2/2002 | Estes et al. | |
| 6,584,837 B2 | 7/2003 | Kurkoski | |
| 6,601,450 B2 | 8/2003 | Burlingame | |
| 6,755,246 B2 | 6/2004 | Chen et al. | |
| 6,766,855 B2 | 7/2004 | Snoga | |
| 6,768,326 B2 * | 7/2004 | Brown et al. | 250/370.11 |
| 6,838,741 B2 | 1/2005 | Sandvik et al. | |
| 7,002,156 B2 | 2/2006 | Sandvik et al. | |
| 7,034,307 B2 | 4/2006 | Sane et al. | |
| 7,313,221 B2 * | 12/2007 | Sowerby et al. | 378/63 |
| 7,675,029 B2 * | 3/2010 | Ramstad et al. | 250/269.1 |

(Continued)

FOREIGN PATENT DOCUMENTS

JP    11023722 A  *  1/1999

(Continued)

OTHER PUBLICATIONS

P. P. Chow et al.; "AlGaN Schottky diodes for short wavelength uv applications," Paper 3948-32 for presentation at SPIE Optoelectronics 2000, pp. 1-20 (10 sheets).

(Continued)

*Primary Examiner* — Kiho Kim
(74) *Attorney, Agent, or Firm* — Mossman Kumar & Tyler

(57) ABSTRACT

A gamma ray detector uses a scintillation detector having a response that matches a response characteristic of a photodiode. The detector may be used to measure natural gamma rays and/or gamma rays produced by interaction of neutrons from a neutron source with the earth formation.

18 Claims, 14 Drawing Sheets

U.S. PATENT DOCUMENTS

| | | | |
|---|---|---|---|
| 2002/0036260 A1* | 3/2002 | Adolph | 250/269.1 |
| 2002/0190207 A1 | 12/2002 | Levy et al. | |
| 2003/0052701 A1 | 3/2003 | Brown et al. | |
| 2003/0080294 A1 | 5/2003 | Matocha et al. | |
| 2003/0081218 A1 | 5/2003 | Orban | |
| 2004/0079526 A1 | 4/2004 | Cairns et al. | |
| 2004/0108530 A1 | 6/2004 | Sandvik et al. | |
| 2004/0257911 A1 | 12/2004 | Tang et al. | |
| 2006/0146335 A1 | 7/2006 | Mitchell et al. | |
| 2007/0034793 A1 | 2/2007 | Estes et al. | |

FOREIGN PATENT DOCUMENTS

| | | |
|---|---|---|
| SU | 1045195 A | 9/1983 |

OTHER PUBLICATIONS

H. T. Califano; "Minitact Gyroscope—The Low Cost Alternative," (date unknown), pp. 1-7.

Measurement of Radiation, Sodium Iodine Detector, p. 11, http://www.physics.isu.edu/radinf/naidetector.htm, Aug. 9, 2005, 1 page.

J. E. Meisner et al.; "CsI(Tl) with Photodiodes for Identifying Subsurface Radionuclide Contamination," IEEE, 1995, pp. 431-434.

E&P Projects, Harsh-Environment Solid-State Gamma Detector for Down-hole Gas and Oil Exploration. http://www.netl.doe.gov/, Oct. 15, 2005, 2 pages.

R. Hulsing; "MEMS Inertial Rate and Acceleration Sensor," IEEE, 1996, pp. 169-176.

O. Degani et al.; "Optimal Design and Noise Consideration of Micromachined Vibrating Rate Gyroscope with Modulated Integrative Differential Optical Sensing," Journal of Microelectromechanical Systems, vol. 7, No. 4, Sep. 1998, pp. 329-338.

P. Adamiec et al.; "Pressure-tuned InGaAsSb/AlGaAsSb diode laser with 700 nm tuning range," Applied Physics Letters, vol. 85, No. 19, Nov. 8, 2004, pp. 4292-4294.

W. Trzeciakowski et al.; "Pressure and temperature tuning of laser diodes," Phys. stat. sol. (b) 244, No. 1, (2007), pp. 179-186.

A. L. Beck et al.; "Quasi-Direct UV/Blue GaP Avalanche Photodetectors," IEEE Journal of Quantum Electronics, vol. 40, No. 12, Dec. 2004, pp. 1695-1699.

J. D. Dupuis et al.; "Growth and fabrication of high-performance GaN-based ultraviolet avalanche photodiodes," Journal of Crystal Growth, 2008, pp. 1-6.

A. Tomoki et al.; "High Gain and High Sensitive Blue-Ultraviolet Avalanche Photodiodes (APDs) of ZnSSe N+-i-p Structure Molecular Beam Epitaxy (MBE) Grown on p-type GaAs Substrates," Japanese Journal of Applied Physics, vol. 44, No. 17, 2005, pp. L508-L510.

Han-Din Liu et al.; "Demonstration of Ultraviolet 6H-SiC PIN Avalanche Photodiodes," IEEE Photonics Technology Letters, vol. 18, No. 23, Dec. 1, 2006, pp. 2508-2510.

Ho-Young Cha et al.; "Temperature Dependent Characteristics of Nonreach—Through 4H-SiC Separate Absorption and Multiplication APDs for UV Detection," IEEE Sensors Journal, vol. 8, No. 3, Mar. 2008, pp. 233-237.

E.V.D. Van Loef et al.; "Scintillation properties of LaBr3:Ce3+ crystals: fast, efficient and high-energy-resolution scintillators," Nuclear Instruments and Methods in Physics Research A 486 (2002), pp. 254-258.

Boston Electronics Corporation, Selection Table, SiC UV Photodiodes with Hybrid Preamps, S:\Product Literature\UV\SiC hybrids selection table 7-15-02.doc.

Boston Electronics Corporation, Q:\Product Literature\UV\UV brochure back cover spectral response.doc, Jun. 26, 2002.

Boston Electronics Corporation, Flame Sensors, May 14, 2001, 3 pages.

Boston Electronics Corporation, Aging properties of Silicon Carbide and various other solid state UV photodetectors under 254 nm Hg lamp irradiation, Feb. 20, 2001, 5 pages.

Boston Electronics Corporation, Ultraviolet Photodetectors, Silicon Carbide (SiC), Gallium Nitride & Aluminum Gallium Nitride (GaN & AlGaN) Titanium Dioxide (TiO2), for more information please consult: IEEE Transactions on Electroni Devices, vol. 40, No. 2, Feb. 1993, 20 pages.

Lightpath Technologies, Gradium Lenses, Focusing on optical solutions, pp. 22-27.

RABUS; "ultra-performance in the ultraviolet," spies oemagazine, Sep. 2003, pp. 21-24.

Hamamatsu, UV TRON Driving Circuit C3704 Series, "Compact, Lightweight, Low Current Consumption, Low Cost Operates as High Sensitivity UV Sensor with UV TRON Suitable for Flame Detectors and Fire Alarms," Jul. 1997, pp. 1-2.

Hamamatsu, Flame Sensor, UV TRON R2868, "Quick Detection of Flame from Distance, Compact UV Sensor with High Sensitivity and Wide Directivity, Suitable for Flame Detectors and Fire Alarms," Mar. 1998, pp. 1-2.

Brilliance 380 Scintillation Material, Product Brochure, Saint-Gobain Crystals, 2 pp. (Jul. 2008).

Downloaded from: //www.bing.com/images/search?q=Electromagnetic+Spectrum+Chart&qpvt=Electromagnetic+Spectrum+Chart&FORM=IGRE (Feb. 9, 2011).

Califano, H.T., "Minitact Gyroscope—The Low Cost Alternative," Position Location and Navigation Symposium, IEEE (Apr. 1994).

Condor Pacific Industries, Inc., "Minitact Two Axis Rate Gyro," pp. 1-3, appendix in "An Ultra Low Weight/Low Cost Three Axis Attitude Readout System for Nano-Satellites," Aerospace Conference IEEE Proceedings (Mar. 2001).

"Ultra Violet Photodetectors" by the distributor Boston Electric is available at: http://www.boselec.com/documents/UVPhotodetectorsWWW8-6-04.pdf (67 pp.) (Nov. 1, 2002).

\* cited by examiner

WIDE BAND GAP SEMICONDUCTOR PHOTODETECTOR BASED GAMMA RAY DETECTORS FOR WELL LOGGING APPLICATIONS

CROSS-REFERENCES TO RELATED APPLICATIONS

This application is a continuation-in-part of U.S. patent application Ser. No. 11/503,688 filed on Aug. 14, 2006 with a priority claim to U.S. Provisional Patent Application Ser. No. 60/708,330 filed on 15 Aug. 2005.

BACKGROUND OF THE DISCLOSURE

This disclosure relates generally to oil and gas well logging tools. More particularly, this disclosure relates tools for measuring rock formation properties such as density and porosity. This disclosure relates to an improved density tool using radiation detectors with improved operating characteristics at high temperatures that may be used in cased holes as well as open holes.

In petroleum and hydrocarbon production, it is desirable to know the porosity and density of the subterranean formation which contains the hydrocarbon reserves. Knowledge of porosity is essential in calculating the oil saturation and thus the volume of oil in-place within the reservoir. Knowledge of porosity is particularly useful in older oil wells where porosity information is either insufficient or nonexistent to determine the remaining in-place oil and to determine whether sufficient oil exists to justify applying enhanced recovery methods. Porosity information is also helpful in identifying up-hole gas zones and differentiating between low porosity liquid and gas.

If the density of the formation is known, then porosity can be determined using known equations. A variety of tools exist which allow the density of the reservoir to be determined. Most of these tools are effective in determining the density (and hence porosity) of the reservoir when the wellbore in which the tool is run is an uncased reservoir and the tool is able to contact the subterranean medium itself. However, once a well has been cased, there exists a layer of steel and concrete between the interior of the wellbore where the tool is located and the formation itself. The well casing makes it difficult for signals to pass between the tool and the reservoir and vice-versa.

Many of the commonly used porosity and density measuring tools rely on the detection of gamma rays or neutrons resulting from activation of either a neutron source downhole or a gamma ray source. Fundamental to the detection of radiation is the use of scintillation counters for radiation detection. Scintillation is produced by ionizing radiation. The light flashes are typically converted into electric pulses by a photoelectric alloy of cesium and antimony, amplified about a million times by a photomultiplier tube, and finally counted. Scintillation counters permit high-speed counting of particles and measurement of the energy of incident radiation.

The use of photomultiplier tubes has several disadvantages. Firstly, photomultiplier tubes require high voltages. The high voltage means that bulky insulation has to be provided. Photomultiplier tubes are inherently bulky, a disadvantage for downhole applications where space is at a premium. Their output can become noisy at the elevated temperatures encountered in boreholes. In order to reduce the effects of elevated temperatures, Dewar flasks may be used to keep the temperature down—another operational disadvantage. The noise becomes worse as the photomultiplier tube ages and has been exposed to long periods of vibration. Photomultiplier tubes can be damaged by vibration and the harsh conditions encountered downhole.

It would be desirable to have downhole radiation detectors that do not suffer from the drawbacks associated with photomultiplier tubes. U.S. patent application Ser. No. 11/503,688 of Estes et al discloses the use of wide bandgap photodiodes instead of photomultiplier tubes. The present disclosure provides a further improvement to the teachings of Estes et al.

SUMMARY OF THE DISCLOSURE

One embodiment of the disclosure is an apparatus configure to estimate a value of a property of an earth formation. The apparatus includes: a device configured to be conveyed in a borehole; a scintillation detector associated with the device and configured to produce a light signal responsive to gamma rays indicative of the property; a photodiode configured to produce an electrical signal responsive to the light signal; and a processor configured to estimate the value of the property using the electrical signal; wherein the scintillation detector has an output that matches a response characteristic of the photodiode.

Another embodiment of the disclosure is a method of estimating a value of a property of an earth formation. The method includes: conveying a device configured into a borehole; using a scintillation detector associated with the device for producing a light signal responsive to gamma rays indicative of the property; using a. photodiode for producing an electrical signal responsive to the light signal, the scintillation detector having an output that matches a response characteristic of the photodiode; and using a processor for estimating the value of the property from the electrical signal.

BRIEF DESCRIPTION OF THE FIGURES

The present disclosure is best understood with reference to the accompanying figures in which like numerals refer to like elements and in which.

DETAILED DESCRIPTION OF THE DISCLOSURE

Figure 1:
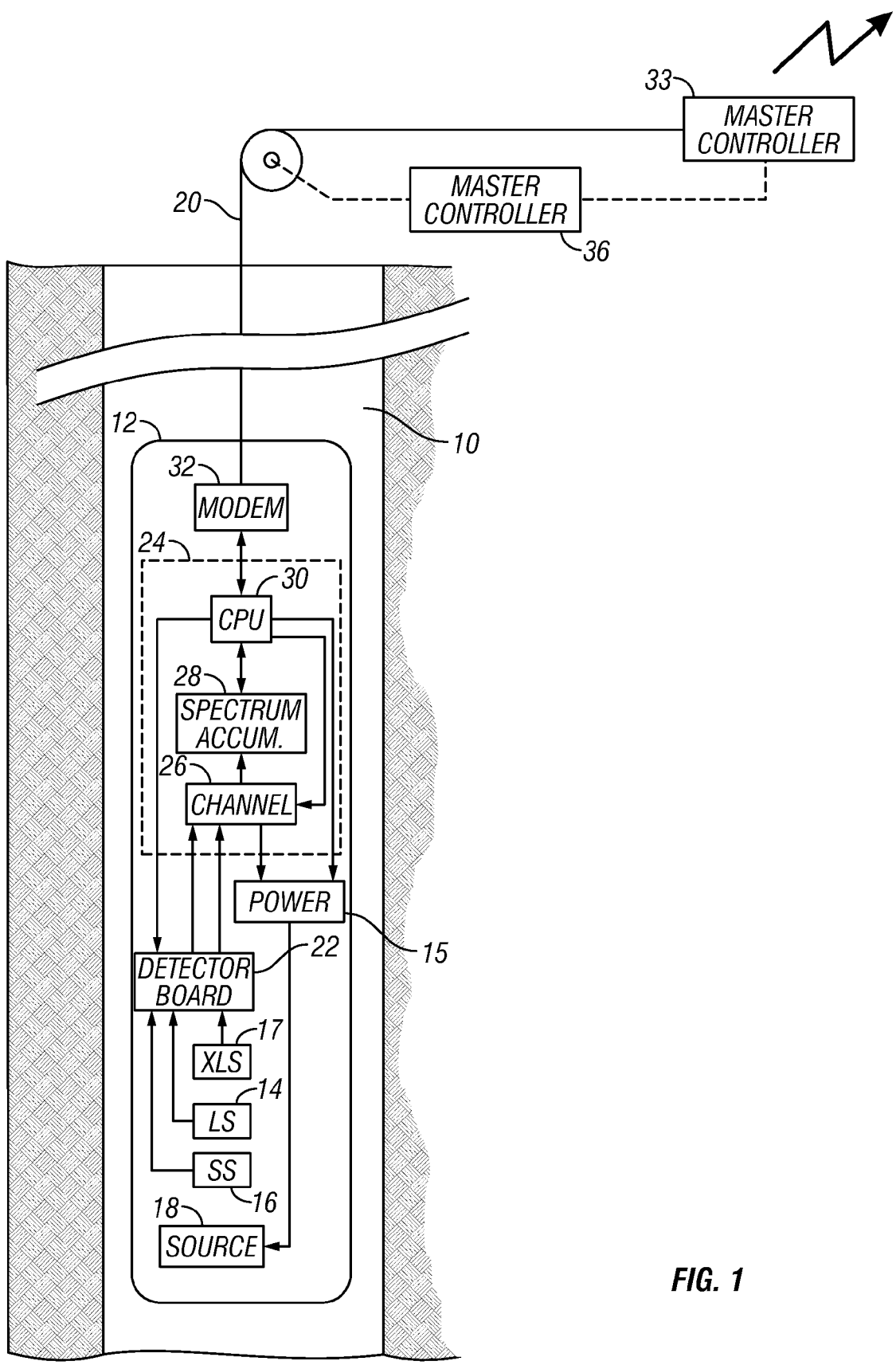
FIG. 1 is an overall schematic diagram of an exemplary nuclear well logging system.

The system shown in FIG. 1 is an exemplary system for density logging. Well 10 penetrates the earth's surface and may or may not be cased depending upon the particular well being investigated. It is a wireline system. This is not a limitation of the disclosure as the method of the disclosure is applicable to MWD systems and an MWD implementation of the apparatus may be done. Disposed within well 10 is subsurface well logging instrument 12. The system diagramed in FIG. 1 is a microprocessor-based nuclear well logging system using multi-channel scale analysis for determining the timing distributions of the detected gamma rays. Well logging instrument 12 includes an extra-long spaced (XLS) detector 17, a long-spaced (LS) detector 14, a short-spaced (SS) detector 16 and pulsed neutron source 18. In one embodiment of the disclosure, XLS, LS and SS detectors 17, 14 and 16 are comprised of bismuth-germanate (BGO) crystals coupled to photomultiplier tubes. To protect the detector systems from the high temperatures encountered in boreholes, prior art detector systems may be mounted in a Dewar-type flask. The present disclosure envisages eliminating the Dewar flask for reasons discussed below. Also, in one embodiment of the disclosure, source 18 comprises a pulsed neutron source using a D-T reaction wherein deuterium ions are accelerated into a tritium target, thereby generating neutrons having an energy of approximately 14 MeV. This particular type of source is for exemplary purposes only and not to be construed as a limitation. The filament current and accelerator voltage are supplied to source 18 through power supply 15. Cable 20 suspends instrument 12 in well 10 and contains the required conductors for electrically connecting instrument 12 with the surface apparatus.

The outputs from XLX, LS and SS detectors 17, 144 and 16 are coupled to detector board 22, which amplifies these outputs and compares them to an adjustable discriminator level for passage to channel generator 26. Channel generator 26 is a component of multi-channel scale (MCS) section 24 which further includes spectrum accumulator 28 and central processor unit (CPU) 30. MCS section 24 accumulates spectral data in spectrum accumulator 28 by using a channel number generated by channel generator 26 and associated with a pulse as an address for a memory location. After all of the channels have had their data accumulated, CPU 30 reads the spectrum, or collection of data from all of the channels, and sends the data to modem 32 which is coupled to cable 20 for transmission of the data over a communication link to the surface apparatus. Channel generator 26 also generates synchronization signals which control the pulse frequency of source 18, and further functions of CPU 30 in communicating control commands which define certain operational parameters of instrument 12 including the discriminator levels of detector board 22, and the filament current and accelerator voltage supplied to source 18 by power supply 15.

The surface apparatus includes master controller 34 coupled to cable 20 for recovery of data from instrument 12 and for transmitting command signals to instrument 12. There is also associated with the surface apparatus depth controller 36 which provides signals to master controller 34 indicating the movement of instrument 12 within well 10. The system operator accesses the master controller 34 to allow the system operator to provide selected input for the logging operation to be performed by the system. Display unit 40 and mass storage unit 44 are also coupled to master controller 34. The primary purpose of display unit 40 is to provide visual indications of the generated logging data as well as systems operations data. Storage unit 44 is provided for storing logging data generated by the system as well as for retrieval of stored data and system operation programs. A satellite link may be provided to send data and or receive instructions from a remote location.

In a well logging operation such as is illustrated by FIG. 1, master controller 34 initially transmits system operation programs and command signals to be implemented by CPU 30, such programs and signals being related to the particular well logging operation. Instrument 12 is then caused to traverse well 10 in a conventional manner, with source 18 being pulsed in response to synchronization signals from channel generator 26. Typically, source 18 is pulsed at a rate of 1000 bursts/second (1 KHz). This, in turn, causes a burst of high energy neutrons on the order of 14 MeV to be introduced into the surrounding formation to be investigated. As discussed below with reference to FIG. 2, this population of high energy neutrons introduced into the formation will cause the generation of gamma rays within the formation which at various times will impinge on XLS, LS and SS detectors 17, 14 and 16. As each gamma ray thus impinges upon the crystal-photomultiplier tube arrangement of the detectors, a voltage pulse having an amplitude related to the energy of the particular gamma ray is delivered to detector board 22. It will be recalled that detector board 22 amplifies each pulse and compares them to an adjustable discriminator level, typically set at a value corresponding to approximately 100 KeV. If such a pulse has an amplitude corresponding to an energy of at least approximately 100 KeV, the voltage pulse is transformed into a digital signal and passed to channel generator 26 of MCS section 24.

In addition, as would be known to those versed in the art, many of the functions of the components described with reference to FIG. 1 may be carried out by a processor. It should also be noted that the system described in FIG. 1 involves conveyance of the logging device into the well by a wireline. However, it is envisaged that the logging device could be part of a measurement while drilling (MWD) bottom hole assembly conveyed into the borehole by a drilling tubular such as a drillstring or coiled tubing. In addition, it should be noted that FIG. 1 illustrates a tool in an open hole. The method and apparatus are equally well suited for use in cased holes.

Figure 2:
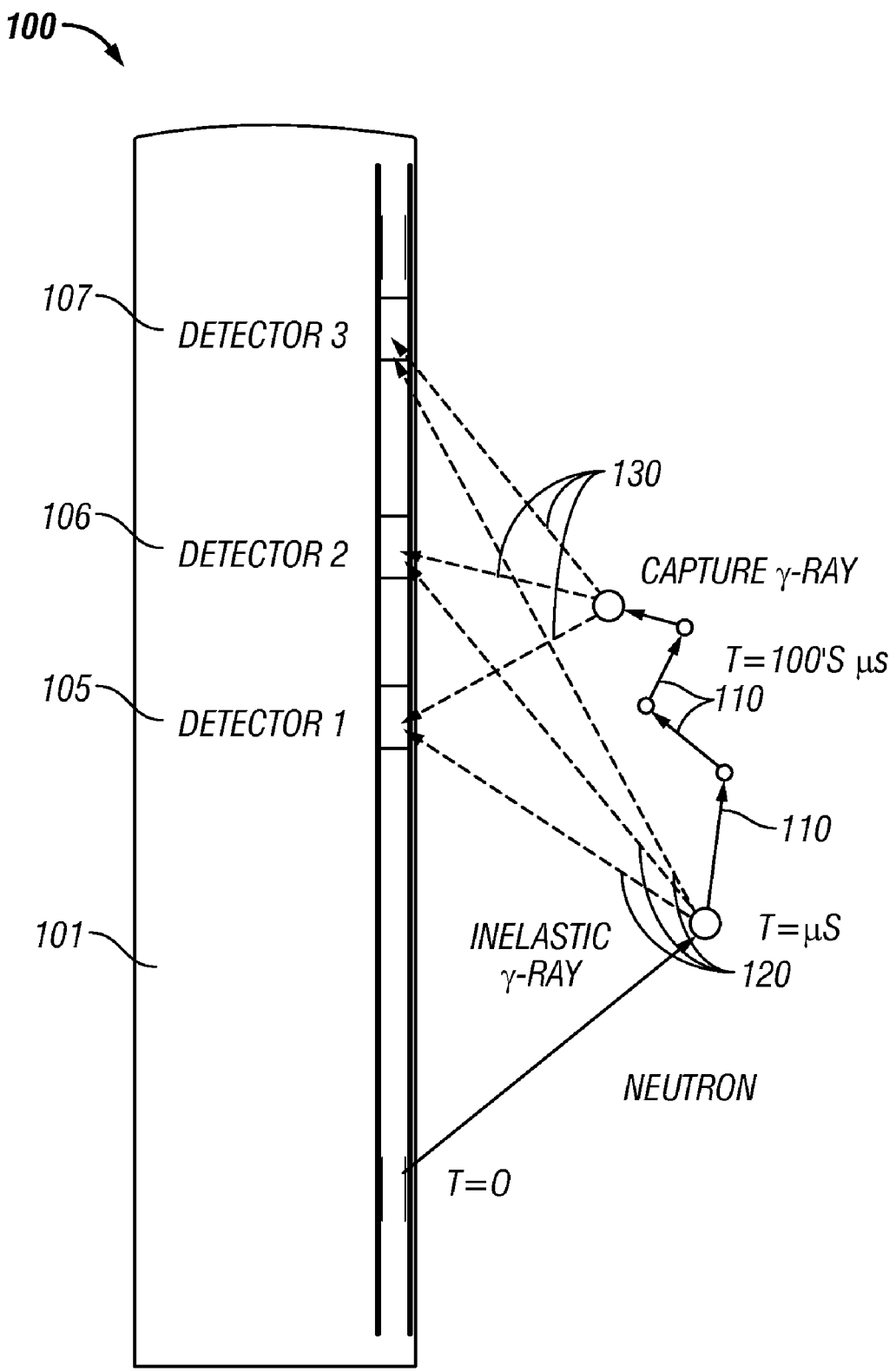
FIG. 2 illustrates the generation of gamma rays by inelastic scattering and capture of thermal and epithermal neutrons.

FIG. 2 shows an illustration of the logging tool suitable for use with the present disclosure. A measurement device 100 comprises a neutron source 101 and three axially spaced apart detectors described below. The number of detectors shown in the embodiment of FIG. 2 is only an example of the number of detectors employed in an embodiment of the present disclosure. It is not a limitation on the scope of the present disclosure. The measurement device of the present disclosure may comprise two or more detectors. The neutron source 101 may be pulsed at different frequencies and modes for different types of measurements. Short-spaced (SS) detector 105 is closest to the source 101. The long-spaced (LS) detector is denoted by 106, and the furthest detector 107 is referred to as the extra-large spaced (XLS) detector. Fast neutrons (approximately 14 MeV) are emitted from the source 101 and enter the borehole and formation, where they undergo several types of interactions. During the first few microseconds (μs), before they lose much energy, some neutrons are involved in inelastic scattering with nuclei in the borehole formation and produce gamma rays. These inelastic gamma rays 120, have energies that are characteristic of the atomic nuclei that produced them. The atomic nuclei found in this environment include, for example, carbon, oxygen, silicon, calcium, and some others.

Two or more gamma-ray detectors are employed, in one or more modes of operation. Such modes include, but are not limited to, a pulsed neutron capture mode, a pulsed neutron spectrometry mode, a pulsed neutron holdup imager mode, and a neutron activation mode. In a pulsed neutron capture mode, for example, the tool pulses at 1 kHz, and records a complete time spectrum for each detector. An energy spectrum is also recorded for maintaining energy discrimination levels. Time spectra from short-spaced and long-spaced detectors can be processed individually to provide traditional thermal neutron capture cross section information, or the two spectra can be used together to automatically correct for borehole and diffusion effects and produce results substantially approximating intrinsic formation values.

Figure 3:
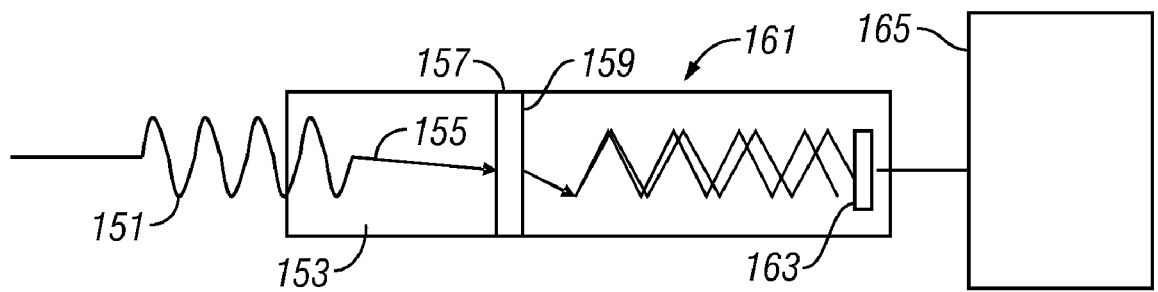
FIG. 3 (prior art) shows the arrangement of a scintillation device and a photomultiplier tube for nuclear radiation measurements.

The basic configuration of a prior art device for measurement of radiation using a scintillation detector is show in FIG. 3. Incoming radiation 151 impinges on the scintillation material 153 which produces light 155. The light passes through an optical window 157 to the cathode 159 of a photomultiplier tube 161. The output of anode 161 of the photomultiplier tube goes to a processor 163 which analyzes the signals.

The present disclosure uses a solid-state device known as an avalanche photodiode instead of a photomultiplier tube for measuring the scintillation. A simple photodiode of comprises a thin semiconductor wafer that converts the incident light photons into electron-hole pairs. As much as 80 to 90 percent of the light photons will undergo this process, and so the equivalent quantum efficiency is considerably higher than in a photomultiplier tube. There is no amplification of this charge in a simple photodiode, however, so the output pulse is likely to be smaller than for a photomultiplier tube. However, the photodiode is a much more compact and rugged device, operates at low voltage, and offers corresponding advantages in certain applications. An avalanche photodiode differs from a simple photodiode in that it has internal amplification.

Photodiodes do not detect photons whose energies are less than the photodiode's bandgap energy. A photon's energy in electron volts is $E=hc/\lambda$, where $hc=1239.84$ eV nm and $\lambda$ is in nm. Therefore, the greater the photodiode's bandgap, the shorter the wavelength of light (towards the blue and ultraviolet) that the photodiode begins detecting. By "blue photodiode", we mean a photodiode that does not see wavelengths longer than blue light, which has a wavelength of approximately 450 nm corresponding to 2.76 eV. Ordinary silicon photodiodes see wavelengths of light that are far longer than blue and which extend into the near infrared around 1100 nm that corresponds to 1.13 eV. Thermally generated electrons and holes reduce photodiode response and increase noise. However, the greater the bandgap, the fewer the number of thermally generated electrons and holes that are created.

Although photodiode designers can reduce the temperature dependence of any wavelength photodiode by adjusting its bulk resistivity or the thickness of the bulk substrate or by other techniques, the dominant factor in the temperature sensitivity of a photodiode is still the photodiode's bandgap. FIG. 1 of U.S. Pat. No. 5,659,133 to Sims et al. shows that, at 160° C., the shunt resistance of a GaP photodiode (bandgap of 2.26 eV corresponding to yellowish-green cutoff) is about 40 million times better (higher) than the shunt resistance of a typical silicon photodiode (bandgap of 1.13 eV). Therefore, unlike the silicon photodiode, the GaP photodiode response will change very little at 160° C. because shunt resistance is inversely related to the number of thermally-excited electrons and holes. In this example, we see that doubling the bandgap energy improved thermal behavior by a factor of 40 million. For reference, Table 1 relates wavelength to photon energy and the common name for the corresponding color of light.

TABLE 1

Wavelength vs Photon Energy and Color Name

| Wavelength | eV | Description |
|---|---|---|
| 350 nm | 3.54 | UV |
| 380 nm | 3.26 | Near UV |
| 400 nm | 3.10 | Border UV |
| 420 nm | 2.95 | Violet |
| 442 nm | 2.81 | Violet-blue |
| 450 nm | 2.76 | Blue |
| 488 nm | 2.54 | Greenish-blue |
| 500 nm | 2.48 | Bluish-green |
| 514 nm | 2.41 | Green |
| 550 nm | 2.25 | Yellowish-green |
| 580 nm | 2.14 | Yellow |
| 594 nm | 2.09 | Orangey-yellow |
| 600 nm | 2.07 | Orange |
| 612 nm | 2.03 | Reddish-orange |
| 633 nm | 1.96 | Orangey-red |
| 647 nm | 1.92 | Red |
| 685 nm | 1.81 | Deep red |
| 700 nm | 1.77 | Border IR |
| 750 nm | 1.65 | Near IR |
| 1100 nm | 1.13 | Silicon photodiode bandgap |

Figure 4:
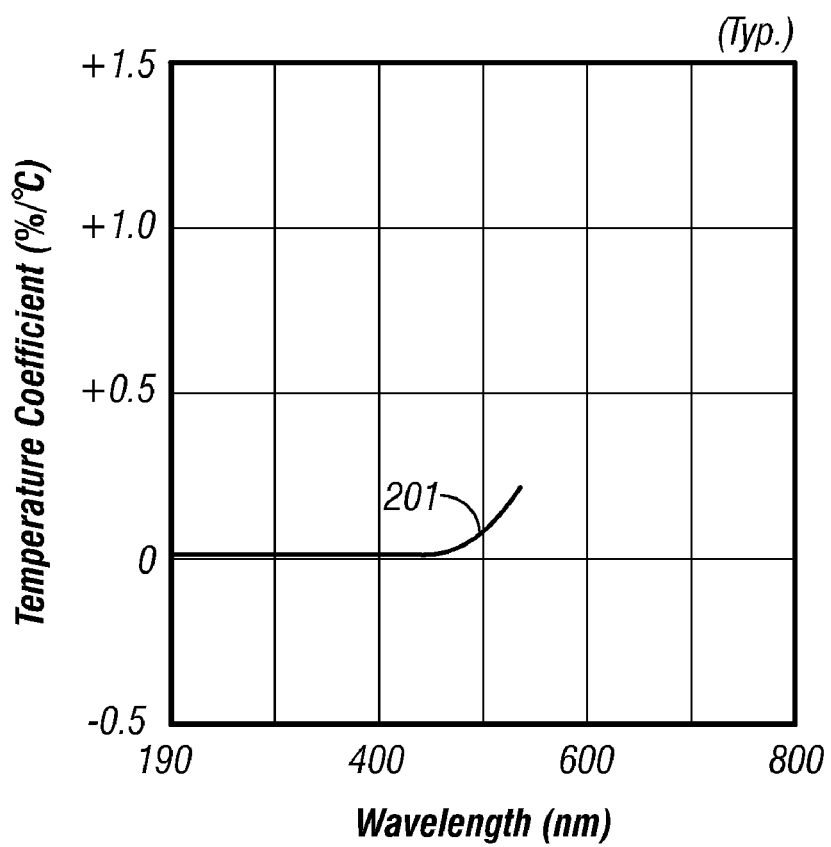
FIG. 4 (prior art) shows the temperature sensitivity of an exemplary photodiode suitable for use with an embodiment of the disclosure.

Referring now to FIG. 4, one advantage of using a photodiode will be apparent. Shown is a curve 201 showing the temperature coefficient (percent per degree Celsius) as a function of wavelength for an exemplary photodiode (the G1961 Gallium Phosphide diode) distributed in the US by Hamamatsu Corporation. The figure shows over a wavelength range of 100 nm to 400 nm, the temperature coefficient is miniscule, so that even at an operating temperature of 200° C., the effect of temperature would be small, and even at a wavelength of 500 nm, the change in the response would be less than 40%.

Figure 5:
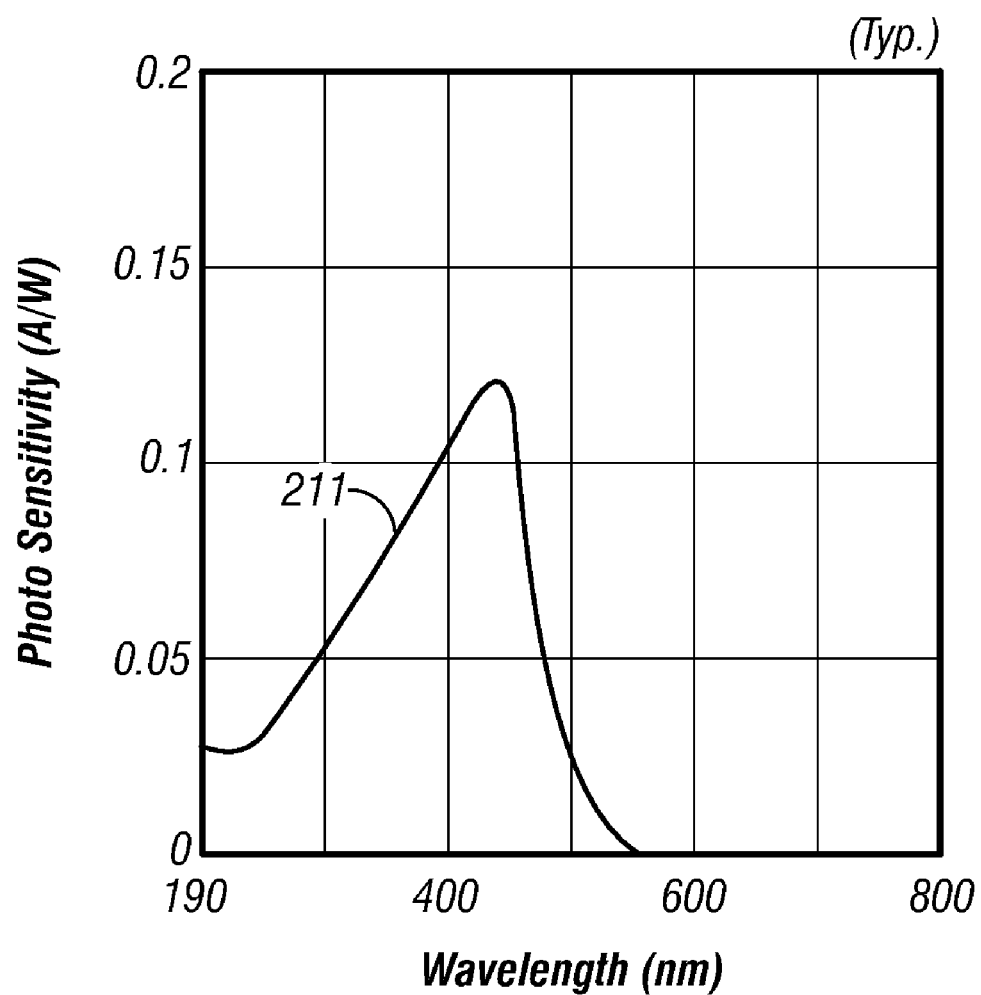
FIG. 5 shows the spectral response corresponding to the temperature sensitivity curve of FIG. 4.

FIG. 5 shows photosensitivity 211 of the G1961 GaP diode. As can be seen, the operating range is from 200 nm-600 nm with a peak sensitivity at 440 nm. 440 nm is in the violet-blue range of the visible spectrum. Other photodiodes such as a Gallium-Nitride photodiode have a peak sensitivity at about 350 nm. Silicon Carbide (SiC) photodiodes may be used over a range of 210-380 nm. With the exception of GaP (550 nm), these wavelengths are in the ultraviolet range (100 nm-400 nm). It is desirable to select scintillation materials to have an output that matches the response characteristics of the photodiodes. Sodium Iodide, for example, has an output below 415 nm while Bismuth Germanate has an output between 320-480 nm. For the purposes of the present disclosure, the important factor is the selection of a photodiode material that has the desired stability at elevated temperatures. It so happens that most of the common photodiodes that meet this requirement have long-wavelength cutoffs between ultraviolet and yellowish-green. The choice of the scintillation materials is then based on the photodiode characteristics to provide a proper match.

The emission spectrum of the scintillation material $I(\lambda)$ should match to the quantum efficiency curve $QE(\lambda)$ of the semiconductor photodetector according to $\lambda[nm]>1240/E_b$ [eV] where $\lambda[nm]$ is in the range the wavelength values corresponding to the nonzero emission intensity in the scintillator emission spectrum and $E_b[eV]$ is the value of the bandgap of the photodetector semiconductor material. In order to achieve this match, there are several factors that can be controlled.

Figure 6:
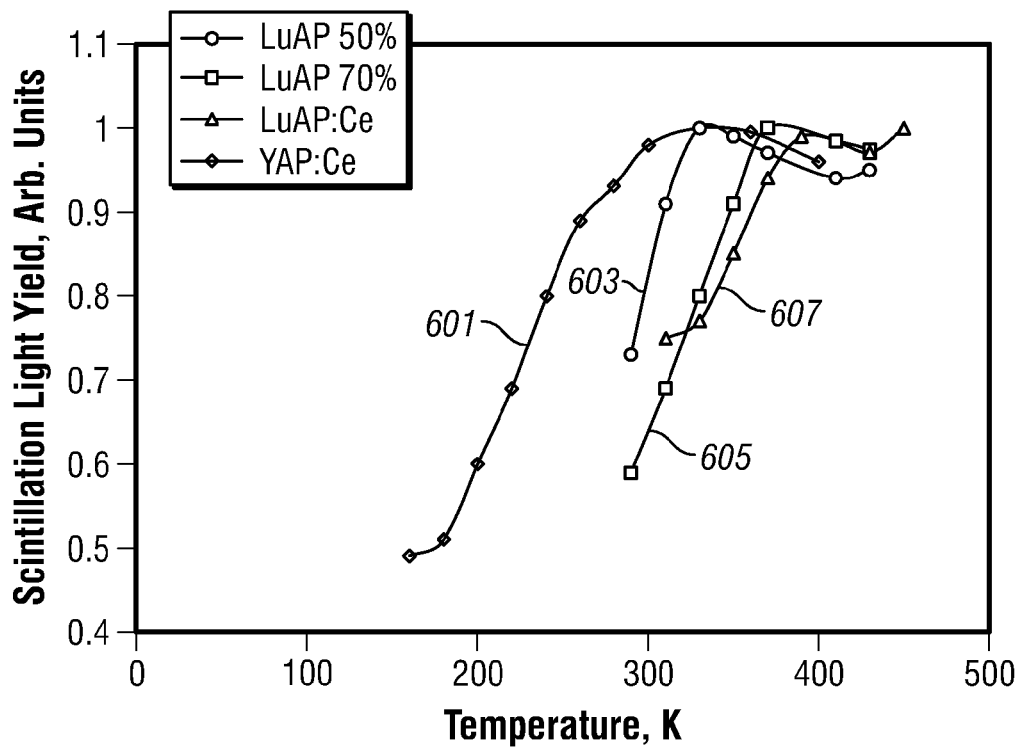
FIG. 6 (prior art) shows the variation of light yield from some scintillation materials with temperature.

FIG. 6 shows the temperature dependence of the output of scintillation materials from the $(Lu_x-Y_{1-x})AlO_3$:Ce family. The abscissa is the temperature and shown are the output curves for $(Lu_x-Y_{1-x})AlO_3$:Ce x=0% (yttrium aluminum perovskite dopped with cerium noted below as YAP) (601), $(Lu_x-Y_{1-x})AlO_3$:Ce x=50% (603), $(Lu_x-Y_{1-x})AlO_3$:Ce x=70% (lutetium yttrium aluminum perovskite dopped with cerium noted below as LuYAP) (605) and $(Lu_x-Y_{1-x})AlO_3$:Ce x=100% (607). We see that scintillators from $(Lu_x-Y_{1-x})AlO_3$:Ce family demonstrates substantial light output at temperatures as high as 175 C and is considered together with scintillators from Brillance® 380_radiation detecting crystals which are used in nuclear instruments with a trademark registered to Saint-Gobain Ceramics & Plastics, Inc. (noted below as [LaBr$_3$;Ce] family and NaI(Tl) (Sodium Iodide) to be high temperature compatible scintillators. Brillance® 380 may be referred to hereafter as Lanthanum tribromide/cesium.

Figure 7:
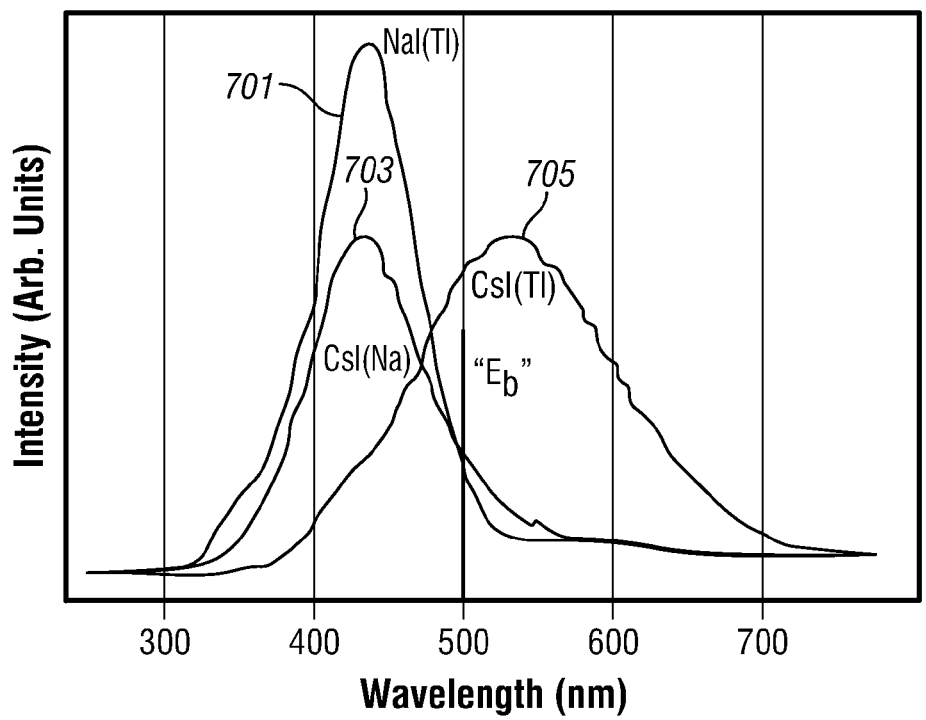
FIG. 7 shows the X-ray excited optical luminescence spectrum of NaI(Tl), CsI(Na) and CsI(Tl) at room temperature.
Figure 8:
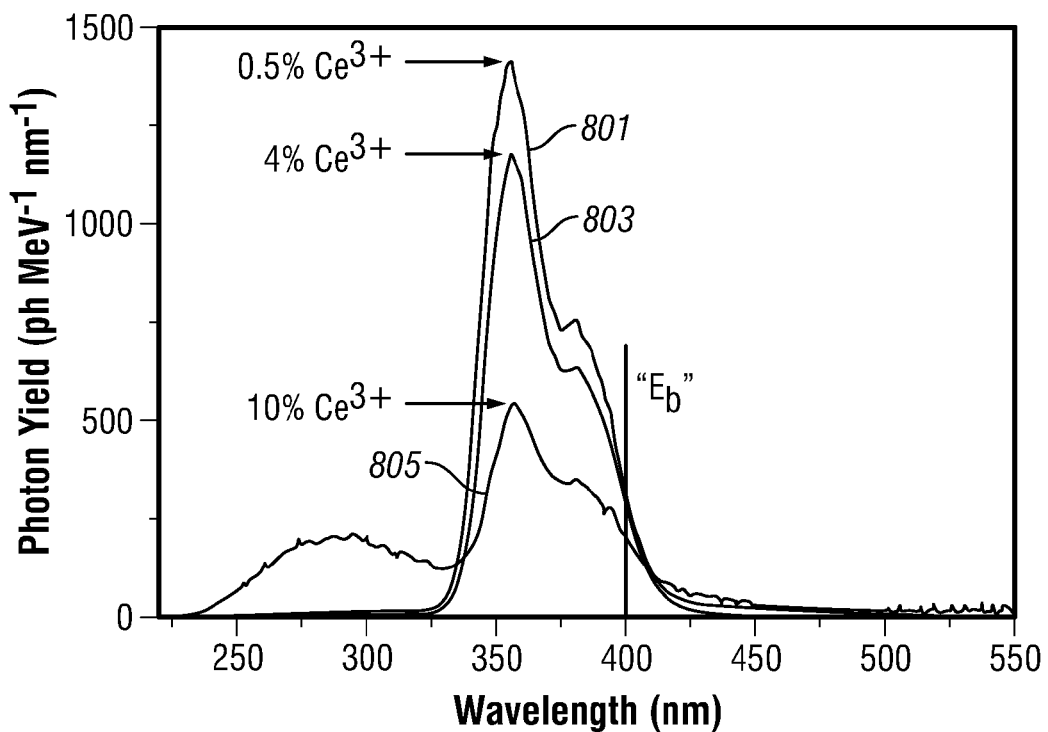
FIG. 8 shows the X-ray excited optical luminescence spectrum of LaBr$_3$:Ce (Brillance® 380 family; Lanthanum tribromide/cesium) at room temperature.

One of the principles underlying the method of the present disclosure is illustrated in FIG. 7. Shown therein are X-ray excited scintillation spectrum of NaI(Tl) 701, CsI(Na) 703 and CsI(Tl) 707 at room temperature. From the curves, it can be seen that CsI doped with Thallium is not a good match with a photodetector having a bandgap $E_b$ corresponding to a wavelength of 500 nm. In contrast, it is seen in FIG. 8 that scintillators of LnBr3:Ce family such as LaBr$_3$ with 0.5% Ce$^{3+}$ (801), 4% Ce$^{3+}$ (803) and 10% Ce$^{3+}$ (805) are well matched to a photodiode having a bandgap corresponding to 400 nm.

Figure 9A:
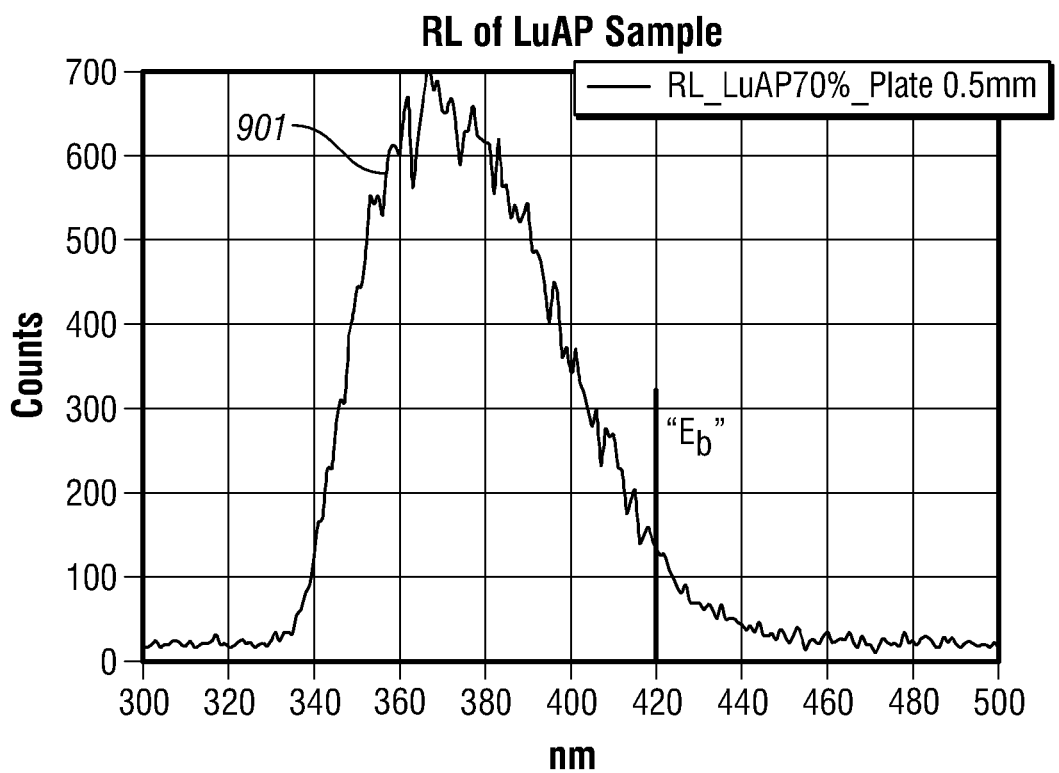
FIG. 9a shows the X-ray excited optical luminescence spectrum of $(Lu_{0.7}—Y_{0.3})AlO_3$:Ce (LuYAP) at room temperature.

Turning now to FIG. 9A, the X-ray excited scintillation spectrum 901 of LuYAP at room temperature is shown. This material is of interest because the proper growth and post growth annealing could potentially "blue shift" the maximum of the luminescence spectrum by ~10 nm from 380 nm to 370 nm.

Figure 9B:
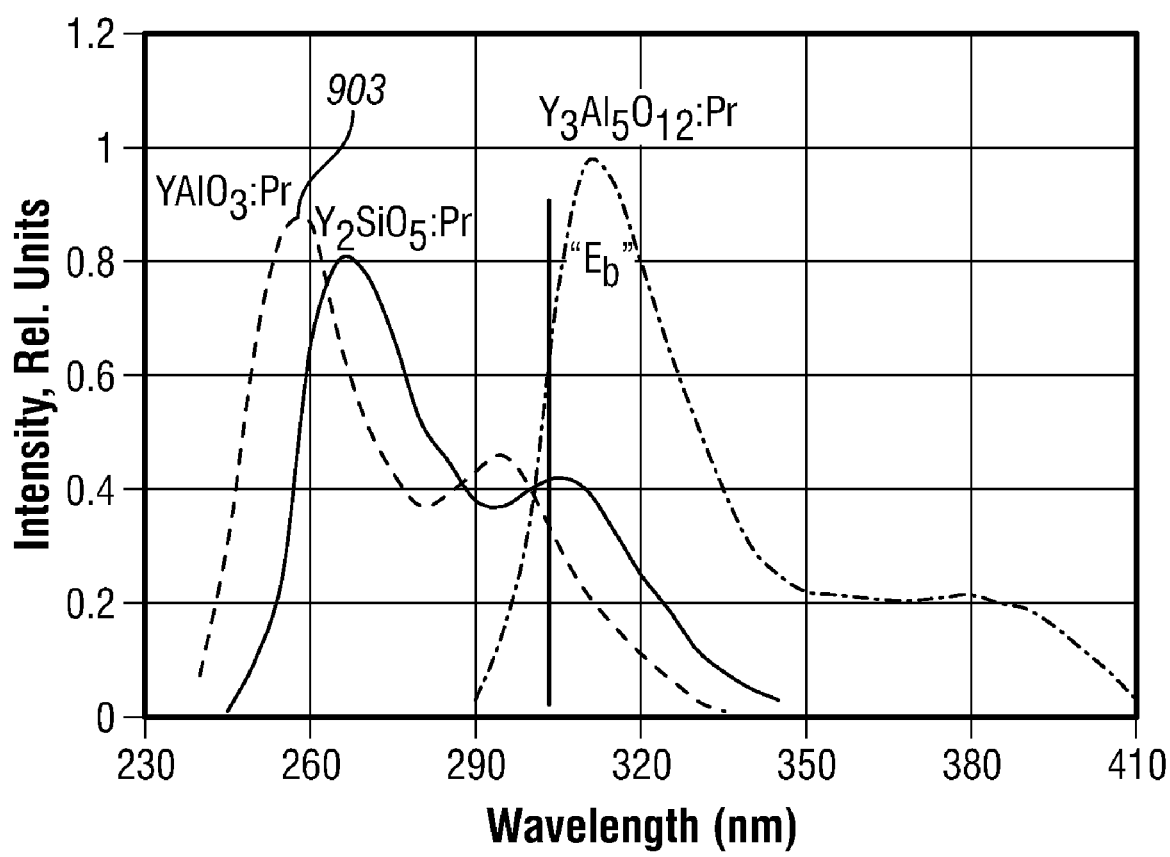
FIG. 9b shows the X-ray excited optical luminescence spectrum of YAlO$_3$:Pr (YAP:Pr), Y$_2$SiO$_5$:Pr and Y$_3$Al$_5$O$_{12}$:Pr at room temperature.

Turning now to FIG. 9B, the X-ray excited scintillation spectrum 903 of YAlO$_3$:Pr (yttrium aluminum perovskite doped with praseodymium noted as YAP:Pr below) at room temperature is shown. This material is of interest because the spectrum of the emitted light lies in the deep UV region mainly below 300 nm.

Figure 10:
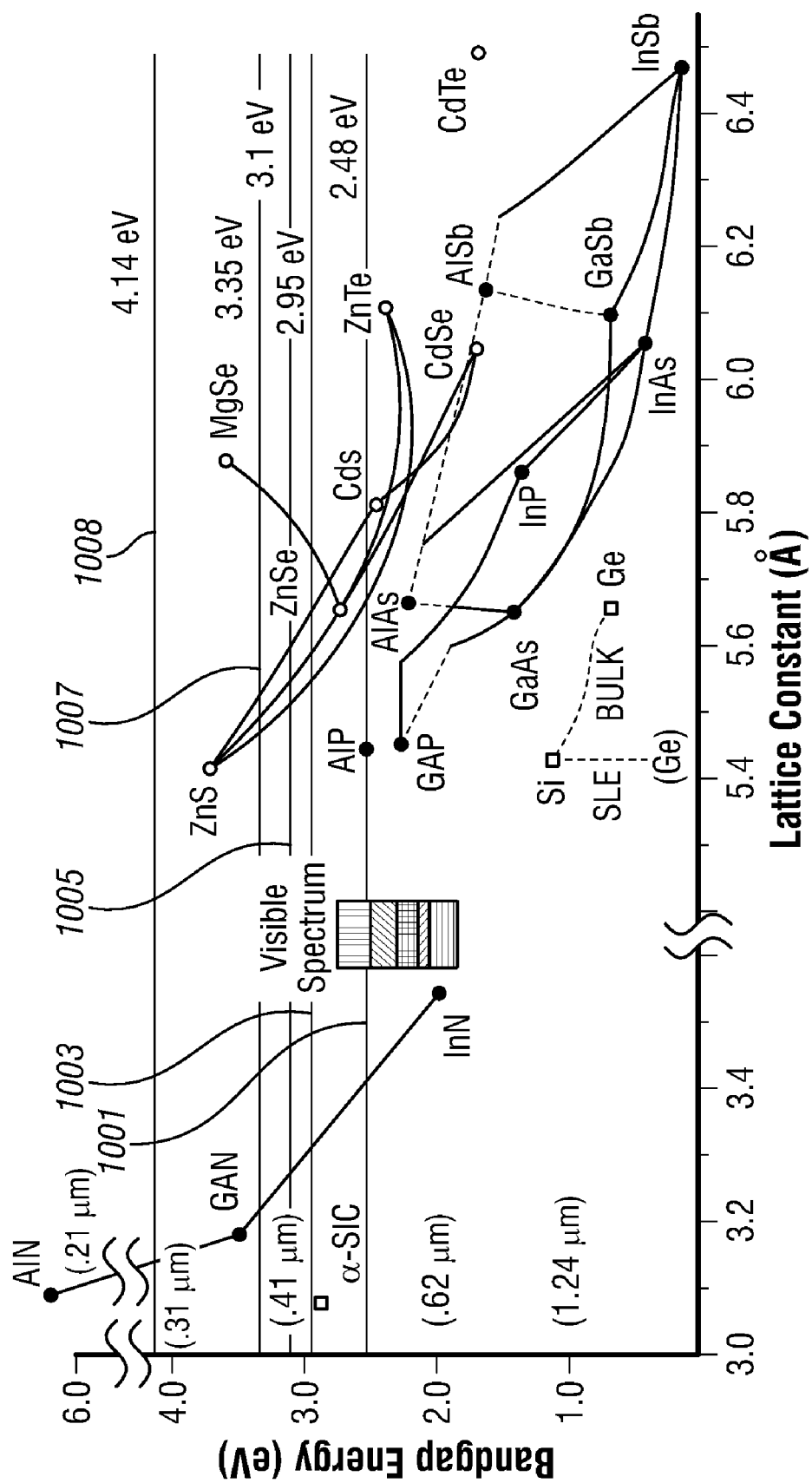
FIG. 10 shows bandgap values as a function of lattice constant for exemplary semiconductors along with luminescence maxima for NaI(Tl), LuYAP, YAP, LnBr3:Ce and YAP:Pr.

FIG. 10 shows exemplary semiconductor materials available in some form for which the bandgap $E_b$ and lattice constant values have been measured. Both direct and indirect bandgap semiconductors are shown. It should be pointed out that not all shown materials are available in the technological form (in the form of the uniform wafers) due to the absence of the appropriate material growth technology. Among wide bandgap semiconductor materials which are technologically available today SiC (IV-IV compound semiconductor), In$_x$Al$_{1-y}$Ga$_{1-x-y}$N (III-N compound semiconductor) and ZnS$_x$Se$_{1-x}$ (II-VI compound semiconductor) have electronic properties ($E_b$ values) close to the requirements formulated above to serve as a candidate for the photodetectors with required properties. Also shown are values of $E_b$ for semiconductor materials optimal for photodiodes for NaI(Tl), LuYAP, LnBr$_3$:Ce, YAP and YAP:Pr 1001, 1003, 1005, 1007, 1008. The spectra for YAP are shown above in FIG. 6.

Figure 11:
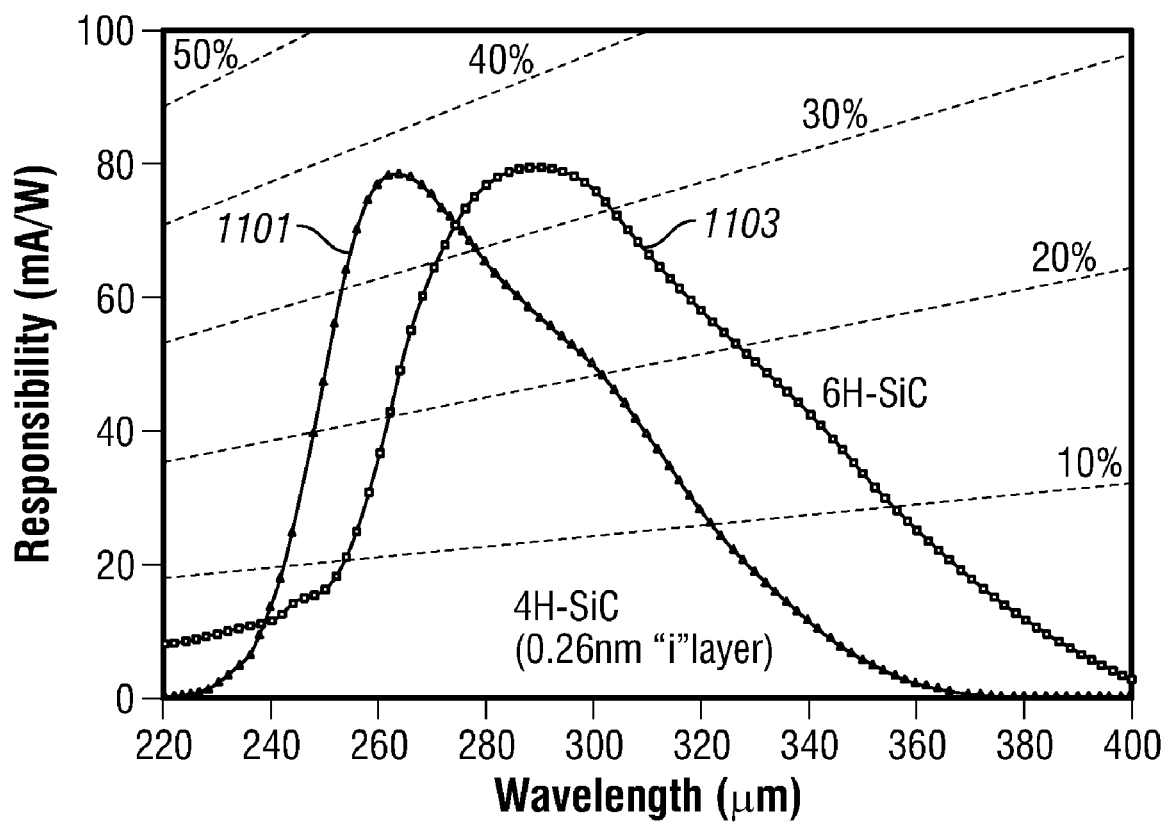
FIG. 11 (prior art) illustrates the spectral responsivity of 6H—SiC and 4H—SiC APD measured at unity gain.
Figure 12:
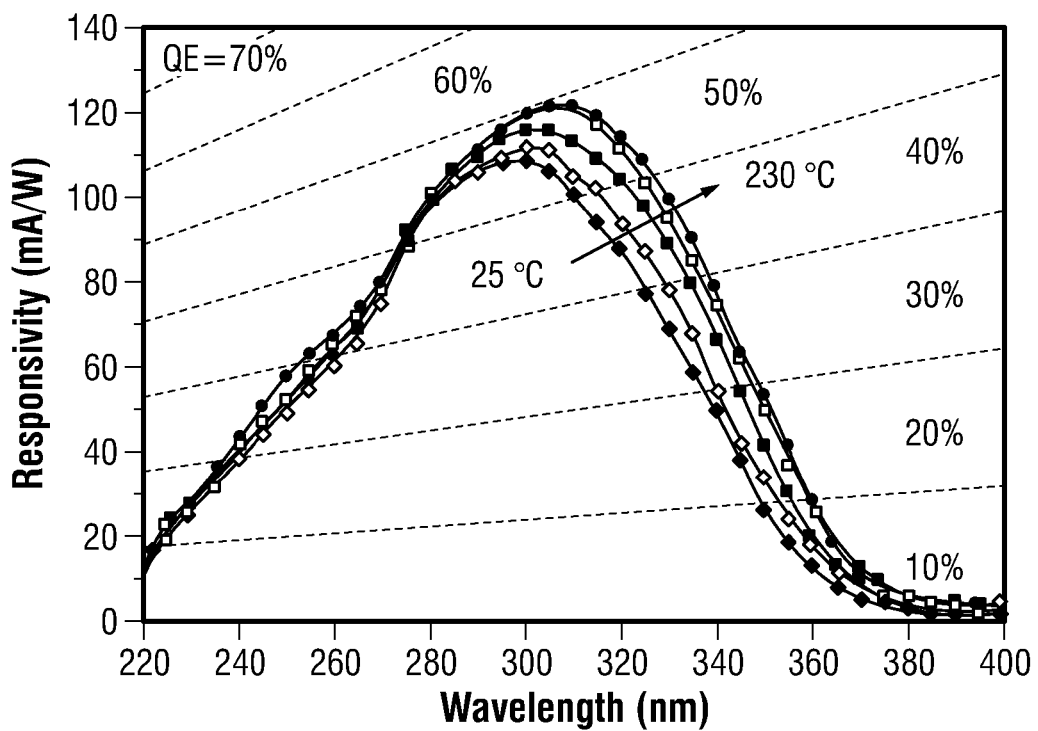
FIG. 12 (prior art) shows the spectral responsivity of 4H—SiC 1×1 mm² SAM APD measured at unity gain for different temperatures.

Next, a few materials for Avalanche Photodiodes (APDs) are reviewed. As noted above, APDs have a higher gain than conventional photodiodes. A potential drawback is a slower response time compared to conventional photodiodes. SiC demonstrates the best performance among all other non Si based APD. FIGS. 11 and 12 show the typical responsivity curve for 4H—SiC APD fabricated in H.-Y. Cha, S. Soloviev, S. Zelakiewicz, P. Waldrab, P. M. Sandvik "Temperature Dependent Characteristics of Nonreach-Through 4H—SiC Separate Absorption and Multiplication APDs for UV Detection" *IEEE SENSORS JOURNAL*, 8 (2008) 233 and 6H—SiC based APD fabricated in X. Bai, X. Guo, D. C. Mcintosh, H.-D. Liu, J. C. Campbell "High Detection Sensitivity of Ultraviolet 4H—SiC Avalanche Photodiodes" *IEEE JOURNAL OF QUANTUM ELECTRONICS*, 43 (2007) 1159. 4H—SiC and 6H—SiC have same chemical composition but different structure of unit cell and as a result different band structure and electronic properties such as $E_b$ and electron and hole mobility values. Plotted on the curves are straight lines of constant quantum efficiency. It can be seen that depending on the design and manufacturing procedure of the device its QE can be as high as 50% with the peak located around $\lambda\sim300$ nm. It can also be seen that there is no significant degradation of this parameter with temperature as shown in FIG. 12.

The 4H—SiC APD demonstrate the performance parameters which make them compatible with PMT for the applications where the detection of light with $\lambda$ in the range between 260 nm and 340 nm is necessary as it can be seen from FIG. 12. Unfortunately this wavelength range does not match to the emission spectra of the available high T compatible scintillators such as NaI(Tl), LnBr$_3$:Ce family and $(Lu_x-Y_{1-x})AlO_3$:Ce family—the QE is much below 10% at 360 nm and 380 nm, the maximum in the emission spectrum both for YAP, LuYAP and LnBr$_3$:Ce. 4H—SiC $E_b$ corresponds to 380 nm so the possible reason for such offset of the $QE(\lambda)$ maximum could be the adsorption of the light with $\lambda$ between 340 nm and 380 nm in the window material of the device which is made of the same SiC but with high concentration of n or p dopants. Potentially different design of device and the use of 6H—SiC can decrease the long wavelength adsorption problem and "red shift" $QE(\lambda)$ maximum. At the same time the maximum of YAP:Pr emission spectrum is below 300 nm and matches to $QE(\lambda)$ of 6H—SiC and 4H—SiC APD's.

Figure 13:
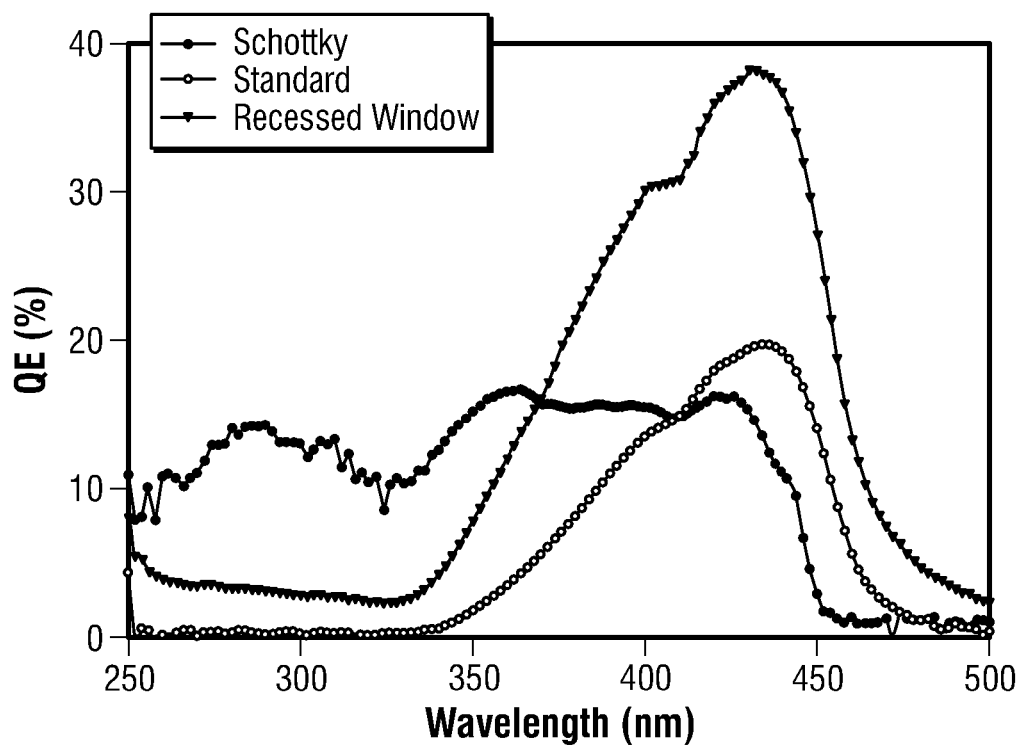
FIG. 13 (prior art) shows the dependence of the quantum efficiency of GaP for different structural configurations.

The $QE(\lambda)$ dependence of the GaP APD is shown in FIG. 13. We see that QE peak value locates around 440 nm and QE is more than 10% in the range between ~360 nm and ~470 nm. $QD(\lambda)$ dependence measured for GaP APD and shown in FIG. 13 does not have a good match to the luminescence spectra of YAP, LnBr$_3$:Ce and LuYAP (the $QD(\lambda)$ peak is too "read shifted") and of NaI(Tl) (the $QD(\lambda)$ peak is too "blue shifted"). It should be pointed out that potentially the different APD design could shift the $QD(\lambda)$ peak position to the lower wavelength side of the spectrum and this will improve the fit between available scintillators and GaP APD. Also even GaP APD reported in A. L. Beck, B. Yang, S. Wang, C. J. Collins, J. C. Campbell, A. Yulius, A. Chen, J. M. Woodall "Quasi-Direct UV/Blue GaP Avalanche Photodetectors" *IEEE JOURNAL OF QUANTUM ELECTRONICS*, 40 (2004), 1695 has $QE(\lambda)>10\%$ for $\lambda>360$ nm what could be enough for the photodetection of the light emitted by LnBr$_3$:Ce, YAP and LuYAP.

Figure 14:
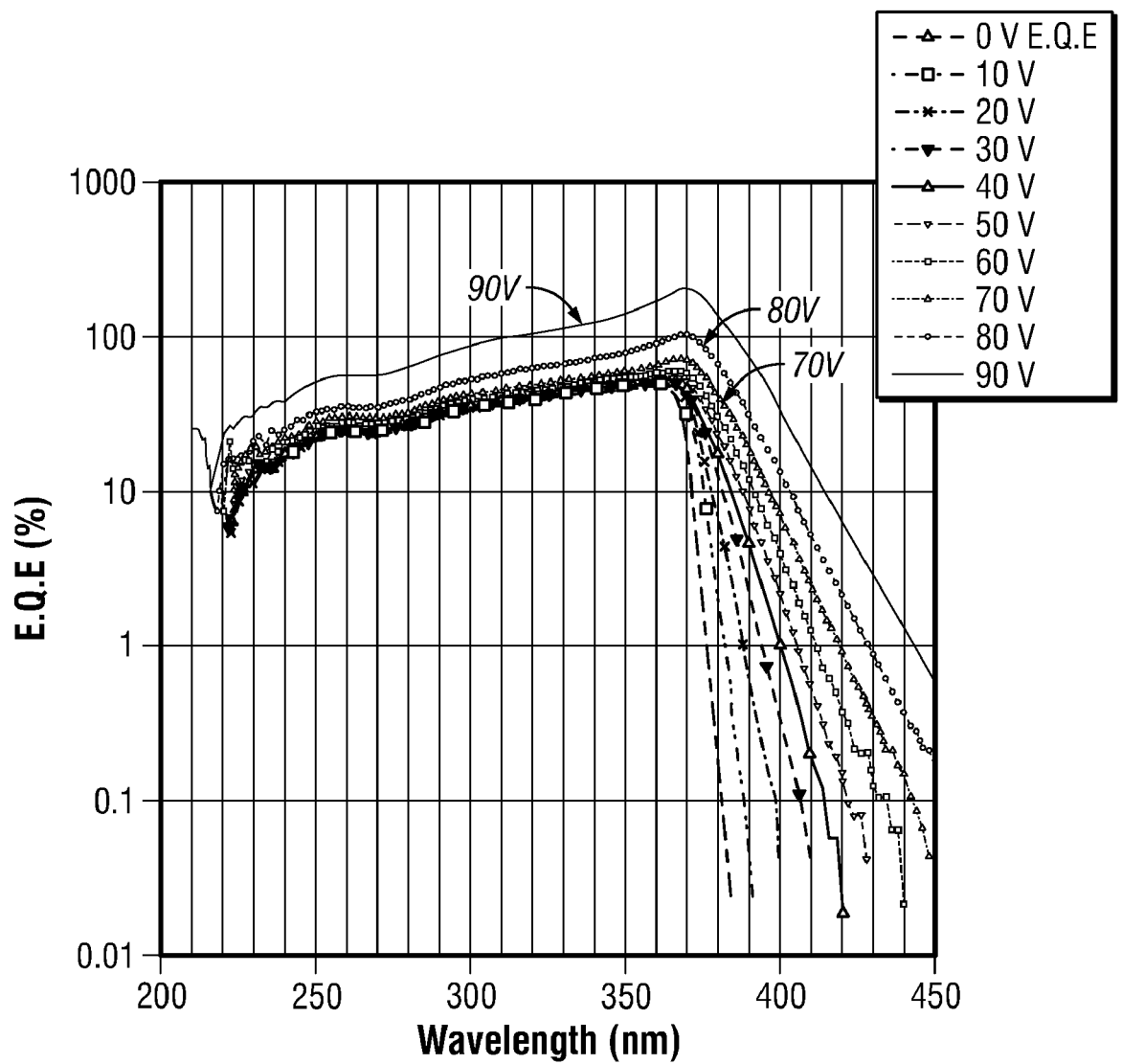
FIG. 14 (prior art) shows quantum efficiency of a 0.1 mm in diameter GaN APD at different values of the bias voltage.

FIG. 14 shows quantum efficiency of 0.1 mm in diameter GaN APD at different values of the bias voltage fabricated in R. D. Dupuis, J.-H. Ryou, S.-C. Shen, P. D. Yoder, Y. Zhang, H. J. Kim, S. Choi, Z. Lochner "Growth and fabrication of high-performance GaN-based ultraviolet avalanche photo-diodes" *Journal of Crystal Growth* 2008. It can be seen that for $V_{bias}=0$ (no gain) the peak of QE($\lambda$) locates at ~375 nm and is equal to ~50%. For LnBr$_3$:Ce and LuYAP the GaN APD QE($\lambda$) are too "blue shifted" but it is better suited to luminescence spectra of these scintillators than SiC APD.

Figure 15:
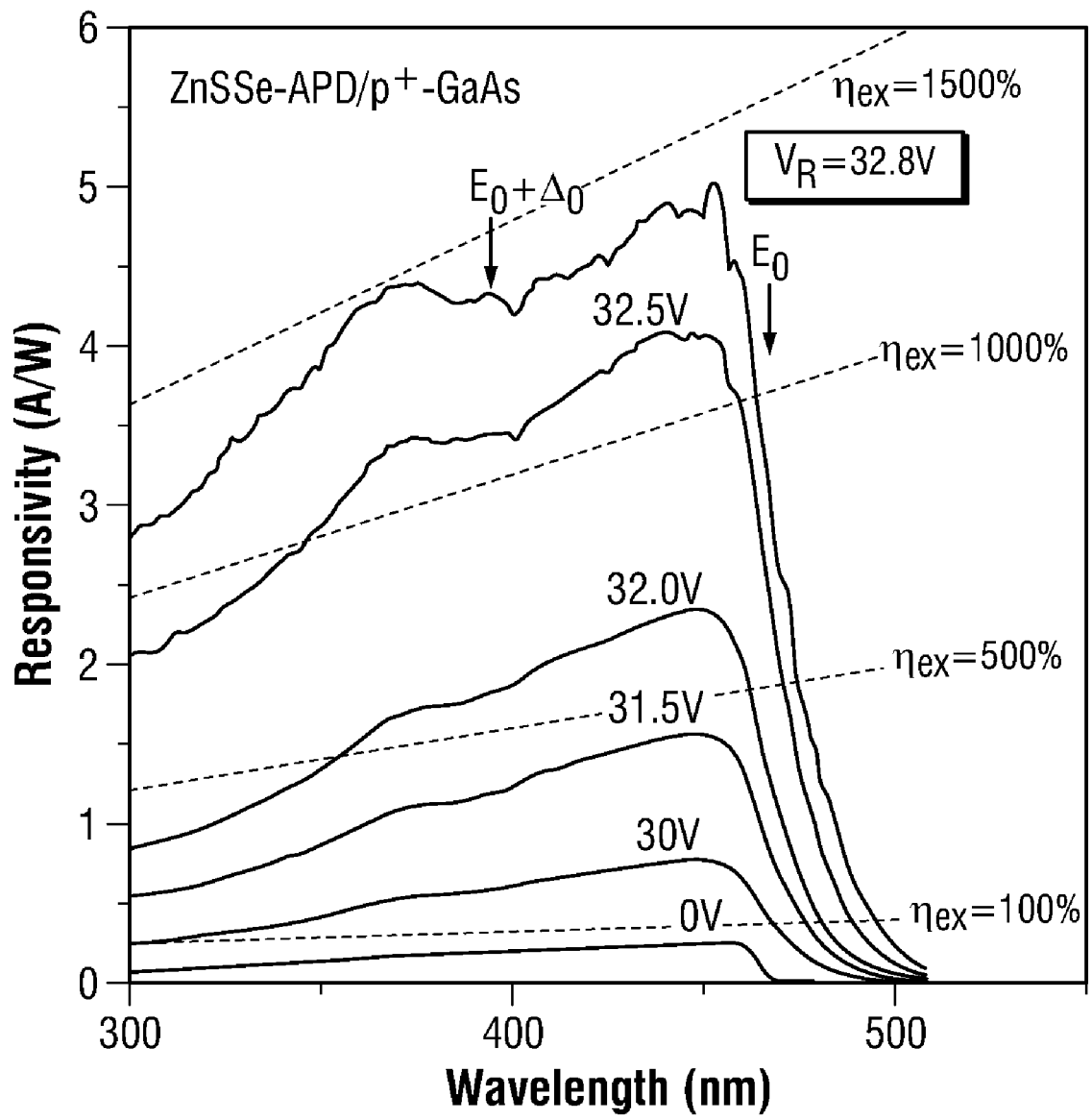
FIG. 15 shows the responsivity and quantum efficiency of a ZnSSe APD at different values of the bias voltage.
Figure 16:
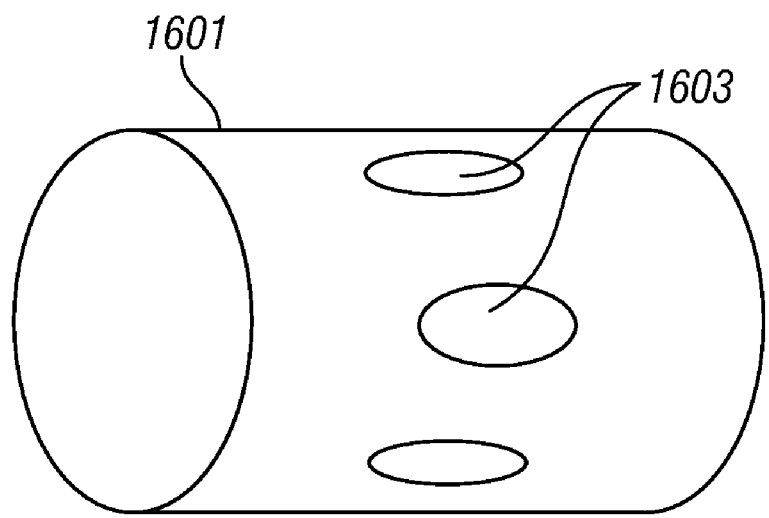
FIG. 16 illustrates the design of gamma ray detector based on the use of scintillation material and solid state photodetectors.

The ZnSeS APD fabricated in T. ABE, K. ANDO, K. IKUMI, H. MAETA, J. NARUSE, K. MIKI, A. EHARA, H. KASADA "High Gain and High Sensitive Blue-Ultraviolet Avalanche Photodiodes (APDs) of ZnSSe np-i-p Structure Molecular Beam Epitaxy (MBE) Grown on p-type GaAs Substrates" *Japanese Journal of Applied Physics* 44 (2005), L 508-L 510 demonstrated very attractive QE($\lambda$) dependence in the wavelength range from 320 nm to 450 nm which matches perfectly to the luminescence spectrum of YAP, LuYAP and LnBr$_3$:Ce (see FIG. 15). ZnSeS APD also demonstrated very low values of $I_d$ at room temperature. High T measurements have not been performed yet but taking into consideration that ZnS$_x$Se$_{1-x}$Te$_{1-x-y}$ growth temperature is equal to ~270° C. the high T operation of ZnSSe device could be problematic due to possible insufficient stability of the device material especially the superlattice structure at 200° C. But at the same time photodetectors made of this material can be used in gamma ray detectors based on YAP, LuYAP and LnBr$_3$:Ce scintillators for downhole applications which do not require high temperature compatibility.

The concept of a matched scintillation crystal and APD may be implemented in a configuration particularly suitable for Measurement while drilling applications. The crystal 1201 surface is covered with a reflective coating which has one or more windows optically coupled with photodetectors 1203. In one embodiment of the disclosure, the scintillation crystal may be YAP and the APD may be GaN or GaP. In another embodiment of the disclosure, the scintillation crystal may be YAP:Pr and the APD may be SiC. The detector illustrated in FIG. 12 may be used for natural gamma ray measurements as well as pulsed neutron spectroscopy.

The monolithic or "single piece" design of solid state photodetector makes such photodetector very vibration and shock resistant. YAP and YAP:Pr has high hardness, is not hydroscopic and does not require special packaging the gamma ray detector. So a gamma ray detector with the proposed design based on "GaN—YAP", "GaP—YAP" or "SiC—YAP:Pr" pairs of "APD—scintillator" also is very vibration and shock resistant. Such detector can be used to perform gamma ray at drill bit measurements. This is illustrated in FIG. 17.

Figure 17:
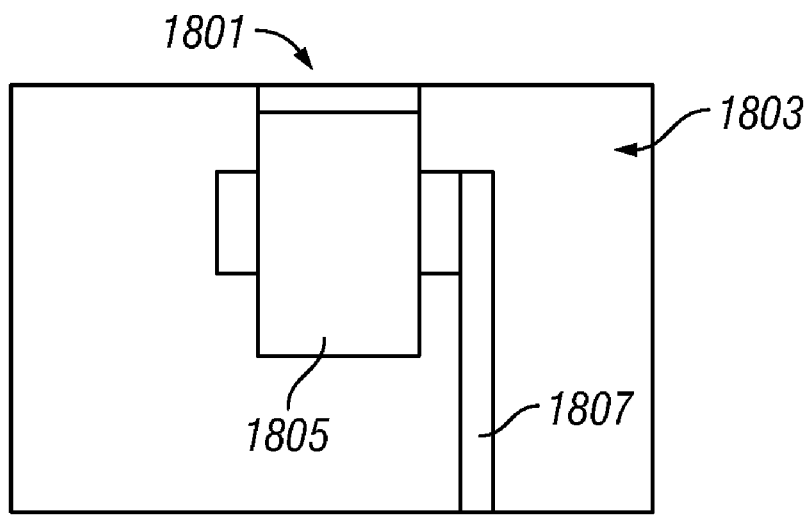
FIG. 17 illustrates a gamma ray at the drill bit sensor.

Shown in FIG. 17 is a drillbit body 1803. The scintillation detector 1805 is provided with a carbon composite window 1801 with silicon carbide or diamond coating. The carbon composite window with the coating provides gamma ray transparency and has acceptable abrasion and corrosion resistance for use on a drillbit. The scintillation detector 1805 is a monolithic detector of the type shown in FIG. 17. A void 1807 is provided in the drillbit for electrical leads from the scintillation detector 1805.

To summarize, in the case of the counting measurements used to measure total gamma ray flux (for example, in measuring a natural gamma ray signal), the detector provides the indication of the detection event in the form of "Yes/No" answer without specific information regarding to the energy of the detected gamma ray. In the case of such detection mode, excess noise and light collection efficiency is not important and APD's manufactured of SiC, GaN, ZnSeS and GaP according to the currently existent technology can be used. In this case APD's can be run both in linear and Geiger modes. Quantum efficiency curves of used photodetectors should match to the emission spectrum of the scintillation material. The possible pairs of "APD-scintillator" which correspond to this requirement are "SiC—YAP:Pr", "GaN—YAP", "GaN—Brilance 380", "GaN—LuYAP", "GaP—LuYAP", "GaP—YAP", "GaP-LnBr$_3$:Ce", "GaP—NaI", "ZnSeS—YAP", "ZnSeS—Brilance 380", "ZnSeS—LuYAP".

In the case of spectroscopic measurements, the detector has to measure with high precision the intensity of the light burst emitted in the process of the interaction of gamma ray with the scintillation material. The optimization of the detector from the light collection capability point of view includes the shape of the scintillation crystal, location of the windows and design of imaging or nonimaging optical elements installed between scintillator and photodetector. As photodetectors the photodiodes with integrated preamplifier and temperature drift detectors should be used because wide bandgap APD have high level of the excess noise due to low charge multiplication coefficients. In the case of spectroscopic measurements of natural gamma rays, the YAP scintillator is good due to the highest density among all available high T compatible scintillators and the absence of the self radiation signal. For natural gamma rays "GaN—YAP", "SiC—YAP:Pr", "ZnSeS—YAP" or "GaP—YAP" pairs could be used. In the case of the spectroscopic measurements of prompt gamma or capture gamma signals in pulse neutron measurements, the signal intensities are much higher than the intensities of the self radiation signals both for LnBr$_3$:Ce and LuYAP scintillators. Accordingly, LnBr$_3$:Ce should be used to obtain the highest spectral resolution due to its superior light yield and LuYAP should be used for the highest efficiency due to its highest density. For this application "GaP—LuYAP", "GaP-LnBr$_3$:Ce", "GaN—LuYAP", "SiC—YAP:Pr" and "GaN-LnBr$_3$:Ce" pairs could be used for the gamma ray detector.

Figure 18:
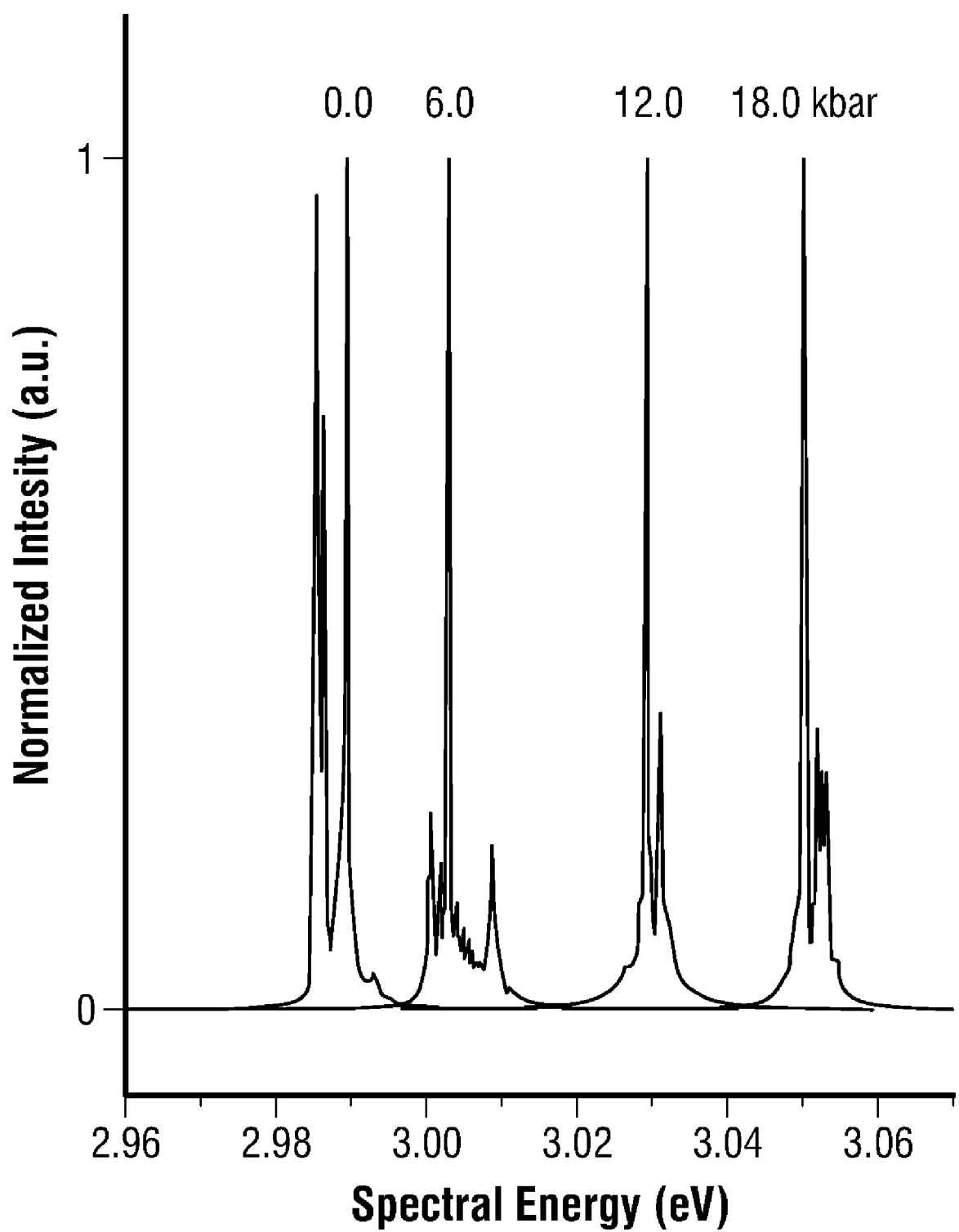
FIG. 18 (prior art) shows the emission spectra of an InGaN/GaN laser photodiode for different pressures.

Another embodiment of the present disclosure takes advantage of the fact that the energy band gap of semiconductors, and therefore their spectral behavior, is pressure dependent. Pressure affects a photodiode's cutoff wavelength. Increasing the pressure will shift the cutoff to shorter wavelengths (a blue shift). Similarly, pressure affects the wavelengths that are emitted by semiconductor light sources, such as light emitting diodes and laser diodes, which is probably the easiest way to illustrate the pressure dependence of a semiconductor's band gap. This is illustrated in FIG. 18. Shown therein are emission spectra of an InGaN/GaN laser photodiode for different pressures. The spectral lines are shifted about 3.6 meV/kbar. Accordingly, in one embodiment of the disclosure, the photodiode or the scintillation crystal-photodiode combination are enclosed in a pressure chamber and the pressure is changed so as to obtain a better match of the spectral characteristics of the photodiode and the scintillation spectrum of the crystal.

Prior art also reports that a semiconductor's band gap and corresponding spectral behavior is temperature dependent. Therefore, a photodiode's cutoff wavelength is shifted to longer wavelengths (red shifted) by increasing the temperature and it is shifted to shorter wavelengths (blue shifted) by lowering the temperature. Similarly, for semiconductor light emitters, cooling increases the emitted photon energy (shorter emission wavelengths) and heating decreases the emitted photon energy (longer emission wavelengths). An increase of 80 meV has been reported for a temperature change from 300° K. to 100° K. The latter temperature is attainable using liquid nitrogen.

The temperature effect can also be seen in FIG. 12 where the wavelength of the peak responsivity changes by around 20 nm over a temperature range of 25° C. to 230° C. In one embodiment of the disclosure, in shallow wells (where the temperature is low), the APD may be heated to decrease the bandgap. Conversely, in deep and hot wells, cooling may be employed to provide adjustment of photodiode properties.

In all cases, the disclosed apparatus includes a processor configured to estimate a value of a property of the earth formation using the measured gamma rays. For natural gamma ray logging, the output is the natural radioactivity of the formation. For pulsed neutron logging, the output may include the porosity, density, gas saturation, oil saturation and/or water saturation of the formation. All of these are done by known prior art methods.

The processing of the measurements made in wireline applications may be done by the surface processor 33, by a downhole processor, or at a remote location. The data acquisition may be controlled at least in part by the downhole electronics. Implicit in the control and processing of the data is the use of a computer program on a suitable machine readable medium that enables the processors to perform the control and processing. The machine readable medium may include ROMs, EPROMs, EEPROMs, Flash Memories and Optical disks.

While the foregoing disclosure is directed to the specific embodiments of the disclosure, various modifications will be apparent to those skilled in the art. It is intended that all such variations within the scope and spirit of the appended claims be embraced by the foregoing disclosure.

What is claimed is:

1. An apparatus configure to estimate a value of a property of an earth formation; the apparatus comprising:
 a device configured to be conveyed in a borehole;
 a scintillation detector associated with the device and configured to produce a light signal responsive to gamma rays indicative of the property;
 a photodiode configured to produce an electrical signal responsive to the light signal responsive to the gamma rays indicative of the property, the photodiode having a spectral response characteristic that matches the spectral output of the scintillation detector;
 an additional device configured to improve the match between the spectral output of the scintillation detector and the spectral response of the photodiode, the additional device being selected from (i) a pressure altering device, or (ii) a temperature altering device; and
 a processor configured to estimate the value of the property using the electrical signal.

2. The apparatus of claim 1 wherein the gamma rays comprise natural gamma rays.

3. The apparatus of claim 1 further comprising a pulsed neutron source associated with the device and wherein the gamma rays result from interaction of neutrons produced by the pulsed neutron source with the earth formation.

4. The apparatus of claim 1 wherein the device further comprises a logging tool configured to be conveyed into the borehole on a wireline.

5. The apparatus of claim 1 wherein the device further comprises a bottomhole assembly configured to be conveyed into the borehole on a drilling tubular.

6. The apparatus of claim 5 wherein the scintillation detector and the photodiode are disposed on a drillbit on the BHA.

7. The apparatus of claim 1 wherein the scintillation detector and the photodiode form a unitary device.

8. The apparatus of claim 1 wherein the scintillation detector and the photodiode form a pair selected from: (i) GaN-YAP, (ii) GaP—LuYAP, (iii) GaP—YAP, (iv) GaP-Lanthanum tribromide/cesium, (v) GaP—NaI, (vi) GaN—LuYAP, (vii) GaN-Lanthanum tribromide/cesium, (viii) SiC—YAP:Pr, (ix) ZnSeS—YAP, (x) ZnSeS—LuYAP or (xi) ZnSeS-Lanthanum tribromide/cesium.

9. The apparatus of claim 1 wherein the photodiode further comprises a wide gap-band photodiode.

10. A method of estimating a value of a property of an earth formation; the method comprising:
 conveying a device configured into a borehole;
 using a scintillation detector associated with the device for producing a light signal responsive to gamma rays indicative of the property;
 using a photodiode for producing an electrical signal responsive to the light signal responsive to the gamma rays indicative of the property, the scintillation detector having a spectral output that matches a spectral response characteristic of the photodiode;
 using an additional device for improving the match between a spectral output of the scintillation detector and a spectral response of the photodiode, the additional device being selected from (i) a pressure altering device, or (ii) a temperature altering device; and
 using a processor for estimating the value of the property from the electrical signal.

11. The method of claim 10 wherein the gamma rays comprise natural gamma rays.

12. The method of claim 10 further comprising activating a pulsed neutron source associated with the device and producing the gamma rays as a result of interaction of neutrons produced by the pulsed neutron source with the earth formation.

13. The method of claim 10 wherein the device further comprises a logging tool, the method further comprising conveying the logging tool into the borehole on a wireline.

14. The method of claim 10 wherein the device further comprises a bottomhole assembly, the method further comprising conveying the BHA into the borehole on a drilling tubular.

15. The method of claim 14 further comprising disposing the scintillation detector and the photodiode on a drillbit on the BHA.

16. The method of claim 10 further comprising forming a unitary device including the scintillation detector and the photodiode.

17. The method of claim 10 further comprising selecting the scintillation detector and the photodiode pair selected from: (i) GaN—YAP, (ii) GaP—LuYAP, (iii) GaP—YAP, (iv) GaP-Lanthanum-tribromide/cesium, (v) GaP—NaI, (vi) GaN—LuYAP, (vii) GaN-Lanthanum tribromide/cesium, (viii) SiC—YAP:Pr, (ix) ZnSeS—YAP, (x) ZnSeS—LuYAP or (xi) ZnSeS-Lanthanum tribromide/cesium.

18. The method of claim 10 further comprising using, for the photodiode, a wide gap-band photodiode.

* * * * *